Aug. 11, 1959  R. R. WILSON  2,899,557
APPARATUS FOR PRODUCING SHADOWGRAPHS
Filed Nov. 2, 1945  3 Sheets-Sheet 2
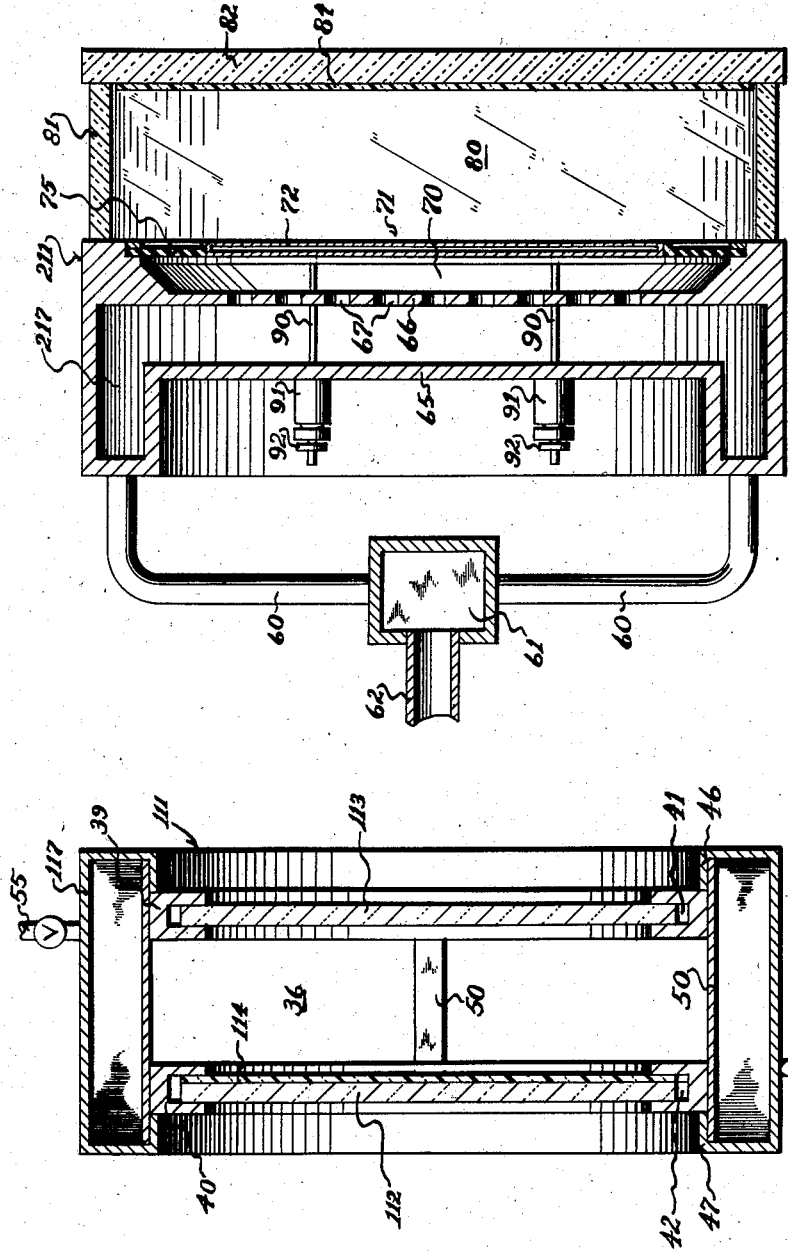
WITNESSES
Ralph Carlisle Smith
Ralph G. Miller
INVENTOR.
Robert R. Wilson
BY

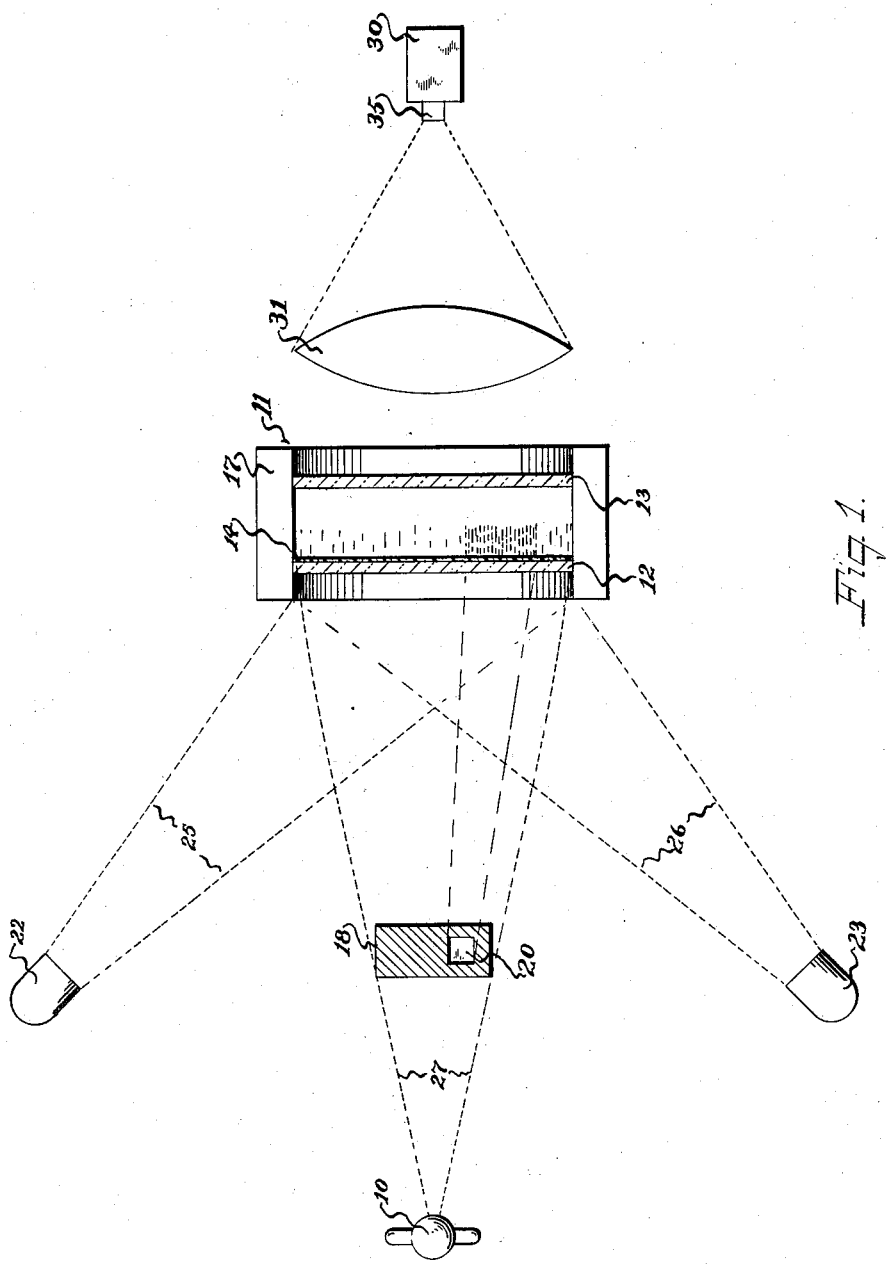

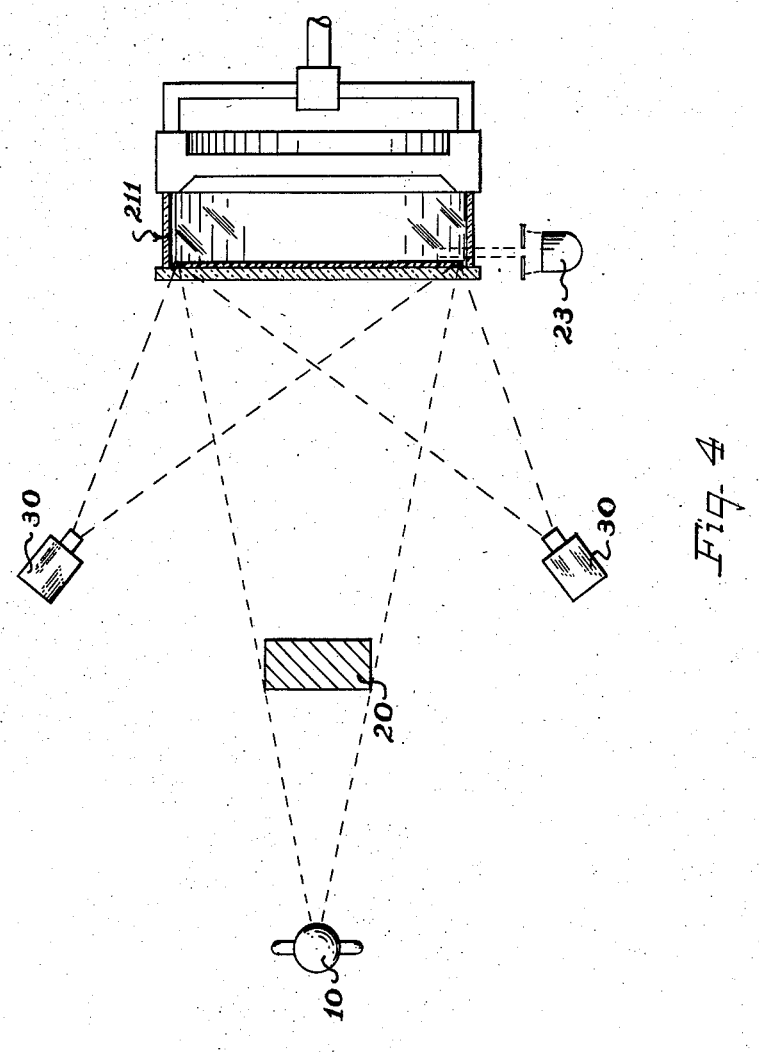

ёunited States Patent Office 2,899,557
Patented Aug. 11, 1959

2,899,557

APPARATUS FOR PRODUCING SHADOWGRAPHS

Robert R. Wilson, Princeton, N.J., assignor to the United States of America as represented by the United States Atomic Energy Commission Application November 2, 1945, Serial No. 626,387

2 Claims. (Cl. 250—65)

This invention relates generally to a method and to apparatus for obtaining shadowgraphs or radiographs of an object exposed to X-rays or the like.

It is known to subject a rapidly moving or rapidly changing object to a burst of X-rays controlled in the time order of a microsecond or more, and to record the physical characteristics of the object at that instant on a photographic plate. For example, such records have been obtained showing the distortion of a golf ball being struck, a projectile moving through the bore of a gun, etc. While the above method of X-ray photography, disclosed in U.S. Patent No. 2,311,705, issued to Charles M. Slack and known to the trade as "Micro-flash" X-ray technique, has proved satisfactory, provided the object under study is such that when disposed between the X-ray source and the photographic plate, distances therebetween are within certain limits dependent upon the strength of the X-ray source, the distances involved in certain explosive tests are often too great to permit the use of this method in certain types of explosive research experiments.

For example, it has been found desirable to record change, as a function of time in the order of a microsecond or less, in an implosion device comprising a metallic sphere subjected to the implosive force of a surrounding sphere by explosive material simultaneously detonated at a plurality of points. The quantity of high explosive material used for this purpose may be such that the X-ray source as well as the photographic plate even when properly shielded must be spaced at considerable distances from the device to withstand the resulting shock wave. Such devices may include, for example, a high explosive sphere comprising a ton or more of material. X-ray equipment housed within a heavy barricade of steel and concrete may be disposed six feet or more from one side of the device with photographic equipment protected in like manner at an equal distance on the opposite side of the device.

In view of the distances necessarily involved between the X-ray source and the recording equipment, the use of a photoresponsive material either with known X-ray tubes or with a magnetic induction device known as a betatron and described in U.S. Patent 2,297,305 issued to Donald W. Kerst on September 29, 1942, may be unsatisfactory, due to the rapid decay in X-ray intensity from the source. While a cloud chamber is well known in the nuclear physics art, having provided one of the most useful instruments at the disposal of the nuclear physicists for the study of the characteristics of the nuclear particles, its use in the manner taught herein to obtain a shadowgraph or radiograph of an object undergoing change is believed novel and has proved highly effective.

It is therefore a primary object of this invention to provide an improved method for recording change, as a function of time, of an object undergoing change.

A further object of the invention resides in the provision and utilization of a cloud chamber in a manner to produce a shadowgraph of an object undergoing change and photographically recording the shadowgraph thus produced.

A still further object is to provide a novel method of recording variations in the intensity of X-rays throughout a certain area as indicative of the physical characteristics of an object interposed between an X-ray source and said area, thereby enabling the recording of variation in X-ray intensities, the X-rays being too weak to produce a satisfactory image on a photographic plate.

A still further object of the invention is to employ a cloud chamber in combination with an X-ray source spaced a considerable distance therefrom, the X-ray source being pulsed in the time order of a microsecond, to obtain a shadowgraph of an object interposed therebetween, the object being subjected to extremely rapid change of physical characteristics.

Other objects and advantages of the present invention will become apparent to persons skilled in the art upon examination of the drawings, the description, and the appended claims.

In the drawings, in which like parts are designated by the same reference characters:

Figure 1 illustrates diagrammatically apparatus suitably arranged to effectively carry out the present invention.

Figure 2 shows in diametric section a cloud chamber of cylindrical configuration provided with transparent end walls and adapted for use with the apparatus of Figure 1.

Figure 3 is a vertical axial section of a cloud chamber of alternate construction having a single transparent end wall.

Figure 4 illustrates diagrammatically the arrangement of apparatus components including a cloud chamber of the type illustrated in Figure 3.

Referring to Figure 1, a source of X-rays 10 is spaced from a cloud chamber 11 provided with a pair of plain glass end walls 12 and 13, transparent to both X-rays and light rays, a sheet of lead glass 14 being contiguously disposed in respect to the inner surface of wall 12. Sheet 14 is transparent to light rays and semi-opaque to the transmission of X-rays therethrough. Chamber 11 may be of cylindrical configuration, including annular housing 17 associated with volume expansion means, not shown, details of the chamber construction being illustrated in Figure 2 and later described. An object 18 to be shadowgraphed is illustrated as provided with an internal chamber 20, object 18 being assumed for purposes of illustration to be opaque to the transmission of X-rays from source 10 except through the area of chamber 20 which is semi-opaque to X-ray transmitted therethrough.

A pair of flood lamps 22 and 23, disposed laterally of object 18 provide illumination of the chamber interior, as shown by dotted lines 25 and 26. A camera 30 and a large focal lens 31 are disposed in alignment with chamber 11 and source 10 with lens 35 of camera 30 and source 10 positioned at the conjugate foci of lens 31.

The improved method of obtaining shadowgraphs through the employment of the apparatus shown in Figure 1 is as follows: With the object 18 to be shadowgraphed suitably disposed between source 10 and cloud chamber 11, source 10, which may be either a conventional X-ray tube or a magnetic induction device, is actuated preferably in a manner to result in an X-ray burst of extremely short duration. For example, the microflash X-ray technique or magnetic induction device, both mentioned above, may be employed to obtain X-ray bursts of approximately one microsecond duration. X-rays diverging from source 10 as illustrated by lines 27 produce a shadowgraph on semi-opaque plate 14 defining the character of object 18. The projected shadow thus formed by incident image-carrying radiation from source 10 causes secondary electron emission from lead glass plate 14, varying in intensity throughout the area thereof in respect to the type of object 18 under observation. For example, if object 18 is completely opaque to X-ray transmission therethrough except through the area of chamber 20, the outline of the margins thereof will appear well defined, chamber 20 being indicated within said outline by increased intensity of electron emission throughout the projected area thereof with resultant increased intensity of cloud chamber tracks throughout a corresponding chamber area as shown in Figure 1 and described below.

The principle of operation of a cloud chamber is well known in the nuclear physics art, hence will be treated briefly. Referring to Figure 2, the chamber 111 shown was particularly designed for use with the apparatus shown and described in connection with Figure 1 above. The device comprises an annular housing or manifold 117 communicating with the chamber 36, disposed centrally thereof. Chamber 36 is defined intermediate an ordinary glass end wall 113 and a lead glass opposite end wall 114, wall 114 having an ordinary glass wall 112 contiguous thereto. Walls 112 and 113 are transparent to both light-rays and X-rays, wall 114 being transparent to light rays but semi-opaque to X-rays. The walls find their support in a pair of annular brackets 39 and 40 provided with suitable inwardly directed channels 41 and 42 in which the walls recess. Chamber 117 is provided with inwardly directed inner wall portions 46 and 47 the inner margins of which sealingly engage brackets 39 and 40 respectively. Brackets 39 and 40 find their support on circumferentially spaced stringers 50, the width of which is small in comparison to the circumference of chamber 36 to provide substantially unrestricted fluid communication between the chamber and manifold interiors.

Volume expansion within chamber 36 may be effected by connection of manifold 117 to a suitable pressure reduction device, not shown, through a plurality of conduits 55 leading throughout the outer manifold wall. One type of suitable pressure reduction device is described in connection with Figure 3 below. It is understood that since cloud chamber operation is dependent upon momentarily maintaining supersaturated vapor condition throughout a volume, a quantity of volatile liquid such as alcohol is introduced into the device prior to operation thereof. Assume a supersaturated vapor condition within chamber 36 caused by rapid volume expansion which is initiated just prior to actuation of X-ray source 10. The image-carrying incident X-rays projected upon sheet 114 result in the ionization of the semi-opaque material thereof with resultant emission of electrons. Electrons thus emitted from the inner surface of plate 114 travel a portion of the distance between the chamber walls, 113 and 114, to produce vapor trails, the intensity of which are, throughout the image area, dependent upon the intensity of the electrons thus emitted. Since the electron emission is dependent upon the number of X-rays reaching plate 114, and the intensity of X-rays vary throughout the image in proportion to the character of the object being shadowgraphed, the cloud chamber image is therefore indicative of the physical character of the object. Since walls 112, 113 and sheet 114 are transparent to light rays, the image produced within the chamber may be visually observed or photographed from either end, preferably being photographed from the end opposite plate 114 as illustrated in Figure 1. The optical system therein has proved effective in obtaining clearly defined photographic records of the shadowgraph.

A cloud chamber 211 of alternate construction and adapted for use with a spaced X-ray source to carry out the present method is shown in Figure 3. The device may be of either rectangular or cylindrical configuration; the description herein referring to the device of cylindrical configuration. The cylindrical manifold chamber 217 may be defined in a casting, as shown, chamber 217 leading through conduits 60 to a common chamber 61 which in turn leads through a conduit 62 to a suitable source of vacuum. Chamber 217 includes the circular end wall 65 and an opposite wall 66 provided with a multiplicity of apertures 67 for fluid communication between the interior of chamber 217 and the contiguous chamber 70 defined intermediate wall 66 and a diaphragm assembly 71. Assembly 71 comprises an inherently rigid circular plate 72, preferably of metal, resiliently mounted by means of a marginal rubber diaphragm 75 to a portion of the casting defining chamber 70.

Assembly 71 provides one wall of a sealed chamber in which a supersaturated vapor condition is to be maintained, the chamber, generically designated 80, being defined intermediate cylindrical wall 81, preferably of ordinary glass, and outer end wall 82, of ordinary glass and provided with a contiguous circular plate 84, of lead glass, at the inner surface thereof, and the resiliently mounted diaphragm assembly 71 above mentioned.

Assembly 71 is normally maintained in the position shown, but upon evacuation of chamber 217 by means of an evacuating device associated with conduit 62, assembly 71 may be rapidly displaced to a position of abutment with wall 66, thereby expanding the volume of the associated chamber 80. If desired the amount of volume expansion of chamber 80 can be adjusted through rods 90, having one end fixed to plate 72 in slidable engagement with gas sealing devices 91, rods 90 being adjustable by thumb screws 92 to permit initial adjustment of chamber 70. Since the position of assembly 71 effecting measurement of volume expansion of chamber 80 is fixed, i.e. abutment of plate 72 with wall 66, the above described adjustment of the assembly 71 which in effect increases the volume of chamber 80 while decreasing the volume of chamber 70 prior to the expansion cycle, effectively governs the degree of vapor supersaturation obtained within the chamber 80 upon actuation of the device, it being well known in the art that such adjustment is rather critical.

The device shown in Figure 3 is adapted for use with an X-ray source suitably spaced from the outer end wall comprising plain glass plate 82 and lead glass plate 84. Since structural limitations preclude viewing the cloud chamber image formed therein from the opposite end of the chamber the image may be viewed either from a point laterally of the image carrying radiation or directly along the axis thereof, for example by suitably disposing a mirror which is transparent to X-ray transmission at the axis of radiation and optically viewing or photographically recording the image from said mirror at a point laterally of said axis. While it is preferred to illuminate the interior of chamber 80 in the manner shown in Figure 1, interior illumination may be effected by the introduction of light rays through the transparent cylindrical wall 81. While the device of Figure 3 presents the disadvantage of image viewing from only the direction of projected radiation, it offers an attendant advantage of structural simplicity in that adjustable volume expansion means are directly associated with the expansion chamber.

The organization of apparatus components utilizing a cloud chamber of the type described with reference to Figure 3 is shown in Figure 4. The X-ray source 10 is supported on the axis substantially of the cloud chamber 211 at a selected distance therefrom. The object 18 is supported on the cloud chamber axis between the X-ray source and the cloud chamber. In order to illuminate the cloud chamber, a light source 23 or a plurality of the same are supported so that light emanating therefrom traverses the cloud chamber. One or more cameras 30 are supported laterally of the cloud chamber axis, in oblique angularity thereto.

By a slight modification of the structure of Figure 3 the device may be utilized for controlling volume expansion of the device of Figure 2. By replacement of chamber 80 with a suitable manifold having plural conduits leading therefrom to conduits 55, Figure 2, and operating the device as above described, the degree of volume expansion occurring within chamber 36 of device 111 may be accurately controlled.

In view of the above teachings, optimum adjustments may readily be obtained by persons skilled in the art by employing known cloud chamber techniques. Further modifications and adaptations will become readily apparent without departing from the spirit and scope of the present invention which is limited only by the scope of the claims appended hereto.

I claim:

1. In a device for recording a shadowgraph of a rapidly changing object subjected to X-ray radiation, the combination including a cloud chamber having a portion thereof transparent to light rays and X-rays, means for illuminating the interior of the cloud chamber, a controlled source of X-rays spaced therefrom, photographic recording means disposed laterally of the linear path intermediate said source and said chamber portion in oblique angularity in respect to said path, an object to be studied disposed intermediate said source and chamber in said linear path to provide an X-ray transmission barrier therebetween, said photographic means being adapted to record a shadowgraph produced in said cloud chamber in response to initiation of said X-ray source.

2. In a device for photographing a shadowgraph of a rapidly changing object subjected to X-ray radiation, the combination including a cloud chamber having a portion thereof transparent to light rays and X-rays, a controlled source of X-rays spaced from the cloud chamber on a median line normal to said portion, substantially; means supported laterally of said cloud chamber portion median line for illuminating the interior thereof, photographic recording means disposed laterally of the cloud chamber portion median line intermediate the X-ray source and the cloud chamber in oblique angularity with respect to said median line, an object to be studied disposed intermediate said source and chamber on said median line to provide an X-ray transmission barrier therebetween, said photographic means being adapted to record a shadowgraph produced in said cloud chamber in response to activation of said X-ray source.

References Cited in the file of this patent

UNITED STATES PATENTS

| | | |
|---|---|---|
| 2,219,113 | Ploke | Oct. 22, 1940 |
| 2,418,523 | Neddermeyer et al. | Apr. 18, 1947 |

OTHER REFERENCES

"An Outline of Atomic Physics," published by John Wiley and Sons, Inc., New York, pages 228 to 231.